United States Patent
Watanabe et al.

(10) Patent No.: US 7,022,020 B2
(45) Date of Patent: Apr. 4, 2006

(54) TRIPOD CONSTANT VELOCITY UNIVERSAL JOINT

(75) Inventors: Yukihiro Watanabe, Iwata (JP); Hideki Kondo, Iwata (JP); Kenji Terada, Iwata (JP); Hisaaki Kura, Iwata (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 09/853,038

(22) Filed: May 11, 2001

(65) Prior Publication Data

US 2002/0032063 A1 Mar. 14, 2002

(30) Foreign Application Priority Data

| May 22, 2000 | (JP) | 2000-150176 |
|---|---|---|
| May 22, 2000 | (JP) | 2000-150182 |
| May 22, 2000 | (JP) | 2000-150192 |

(51) Int. Cl.
*F16D 3/205* (2006.01)

(52) U.S. Cl. ........................ 464/111; 464/124
(58) Field of Classification Search ............. 464/111, 464/123, 124, 132, 905
See application file for complete search history.

(56) References Cited

U.S. PATENT DOCUMENTS

| 3,613,396 A | * | 10/1971 | Drevard et al. | 464/111 |
|---|---|---|---|---|
| 4,318,574 A | | 3/1982 | Nakamura | |
| 4,571,214 A | * | 2/1986 | Orain | 464/111 |
| 4,773,890 A | * | 9/1988 | Iwasaki et al. | 464/111 |
| 5,098,342 A | * | 3/1992 | Mizukoshi | 464/111 |
| 5,129,860 A | * | 7/1992 | Asahara et al. | 464/111 |
| 5,376,050 A | * | 12/1994 | Krude et al. | 464/111 |
| 5,474,500 A | * | 12/1995 | Girguis | 464/111 |
| 6,033,311 A | * | 3/2000 | Bartlett | 464/111 |
| 6,176,787 B1 | * | 1/2001 | Oh | 464/111 |
| 6,190,260 B1 | * | 2/2001 | Flores et al. | 464/111 |

FOREIGN PATENT DOCUMENTS

| DE | 198 22 464 A1 | 1/1999 | |
|---|---|---|---|
| FR | 1268690 | * 6/1961 | 464/111 |
| FR | 2 596 829 | 10/1987 | |
| FR | 2 656 394 A | 6/1991 | |
| FR | 2 672 092 | 7/1992 | |
| GB | 1 520 060 A | 8/1978 | |
| JP | 55-017765 | 7/1980 | |
| JP | 06 137339 | 5/1994 | |
| JP | 08 326770 | 12/1996 | |
| JP | 10 184716 | 7/1998 | |
| JP | 11-210776 | 3/1999 | |
| JP | 2000 161378 A | 6/2000 | |
| WO | 98/273848 A | 6/1998 | |

OTHER PUBLICATIONS

Patent Abstracts of Japan for Pub. No. 08326770, published Dec. 10, 1996.
Patent Abstracts of Japan for Pub. No. 06137339, published May 17, 1994.
Patent Abstracts of Japan for Pub. No. 10184716, published Jul. 14, 1998.

* cited by examiner

*Primary Examiner*—Greg Binda
(74) *Attorney, Agent, or Firm*—Arent Fox PLLC

(57) ABSTRACT

A tripod constant velocity universal joint including an outer joint member having three axial track grooves in an inner periphery and roller guide surfaces formed in opposing side walls of each track groove. A tripod member has three radially projecting trunnion journals and rollers that rotate around respective trunnion journals through a plurality of needle rollers and are received in the track grooves of the outer joint member. Each roller is guided on an outer peripheral surface by the roller guide surfaces. Contact between the roller and roller guide surfaces is circular having a contact ratio that is 1.01 or higher. The contact ratio is defined by a widthwise length of the contact ellipse formed by the roller contacting the guide surface relative to the width of said roller.

5 Claims, 10 Drawing Sheets

Fig.4A
RELATED ART
Fig.4B
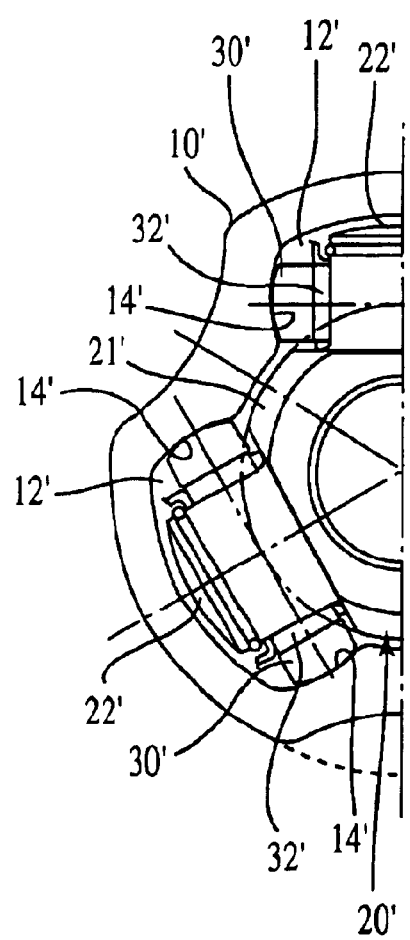
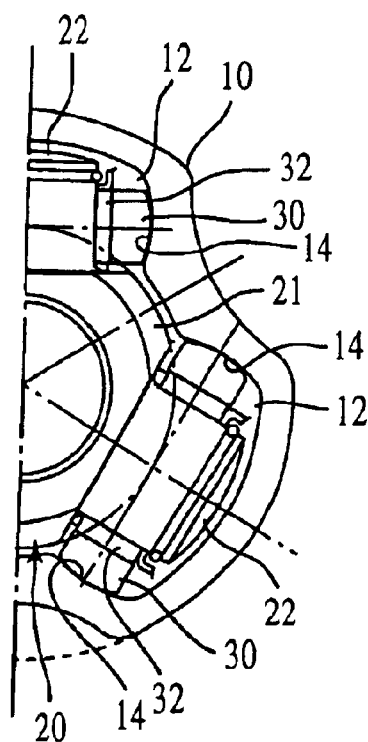

TRIPOD CONSTANT VELOCITY UNIVERSAL JOINT

BACKGROUND OF THE INVENTION a. Field of Invention

The present invention relates to a plunging type tripod constant velocity universal joint for use in transmission of power in automobiles, industrial machines, and the like.

b. Prior Art

A conventional tripod constant velocity universal joint, as shown in the FIG. 4A, comprises an outer joint member 10' having three axial track grooves 12' in the inner periphery thereof and formed with roller guide surfaces 14' in the opposed side walls of each track groove 12', a tripod member 20' having a trunnion barrel 21' adapted to be fitted to a shaft for torque transmission and trunnion journals 22' radially projecting from three circumferentially equispaced positions on the trunnion barrel 21', and rollers 30' each rotatable around the trunnion journal 22' through a plurality of needle rollers 32' and received in the track groves 12' of the outer joint member 10', the roller 30' being guided in the outer peripheral surface by the roller guide surfaces 14'.

There are two forms of contact between the roller 30' and the roller guide surfaces 14'; angular contact and circular contact Angular contact has a certain contact angle and occurs at two points (FIG. 5A). Circular contact occurs at one point and the contact ratio generally employed ranges from 1.002 to 1.008 (FIG. 5B).

In the case of angular contact, when a contact ellipse is produced at two points in the direction of the contact angle and a predetermined torque T is applied, it is necessary that the contact ellipse be in the width of the roller 30'. For this reason, in the existing circumstance, the proportion of the width of the roller 30' to the outer diameter ranges from 32% to 36%. Further, even if the contact angle and contact ratio are reconsidered, the total widthwise contact length exceeds the width of the roller 30'. The phenomenon of both ends of the roller 30' cutting into the roller guide surfaces 14' or the phenomenon of two contact ellipses overlapping each other in the middle of the roller 30', which has been an obstacle to improvement of life and to the reduction of vibration, cannot be avoided.

In the case of conventional circular contact, since the contact ratio ranges from 1.002 to 1.008 when a predetermined torque T is applied, the widthwise contact ellipse length some times exceeds the width of the roller 30'. For this reason, there is a limit to the reduction of the width of the roller 30' as in the case of angular contact. In the existing circumstances, the proportion of the width of the roller 30' to the outer diameter ranges from 32% to 36%. Further, if the width of the roller 30' is reduced, the total widthwise contact length far exceeds the width of the roller 30', obstructing the improvement of life and the reduction of vibration.

Further, in both angular contact and circular contact, the roller guide surfaces 14' have a radius of curvature R at a certain contact ratio and the major and minor inner diameters are, as such, connected. When the tripod joint is rotating while taking an operating angle, an angular displacement also occurs between the roller 30' and the roller guide surfaces 14'. This causes wearing of the roller guide surfaces to proceed. Then, there occurs on both the major and minor diameter sides the phenomenon of both ends of the roller 30' cutting into the roller guide surfaces 14', forming a cause of increasing the vibration.

Accordingly, an object of the invention is to solve the problems as described, so as to achieve reduced vibration and hence weight reduction and compactification of a tripod joint without aggravating the vibration characteristics.

In the conventional tripod joint, the clearances (radial clearance, circumferential clearance) between the trunnion journal 22', the needle rollers 32' and the roller 30' have not been set in consideration of the skew angle. The skew of a roller, as shown in FIG. 6, means that the axis of the roller inclines at a certain small angle (θ) rather than forming right angles with the direction of travel.

It has been found that the noise, vibration, hardness (hereinafter "NVH") characteristic of tripod joints depends on the angle at which needle rollers can actually skew. The skew angle is determined by the radial clearance and circumferential clearance but this has not heretofore been taken into consideration. Therefore, the NVH characteristic differs according to differences in the proportions or size of a tripod joint and optimization of this situation has not been made at present.

Another object of the invention is, therefore, to reduce vibration of tripod constant velocity universal joints by suppressing the skew of needle rollers.

Generally, tripod joints are designed with particular attention paid to the aspect of strength (torsional strength). The strength is uniquely determined usually by the minimum outer diameter of the shaft, and then the strength of the tripod member or the strength of the roller is considered. The strength is evaluated mainly in two ways: static torsional strength (test), and pulsating fatigue strength (test). Usually, in the two tests, it is arranged that the shaft is the first to break. Therefore, it is arranged thaw the tripod member or the roller has a strength no less than that of the shaft.

The static torsional strength is evaluated, in a static torsional test with torque applied to a tripod joint, by a torque with which one region or another is torsionally broken. The pulsating fatigue strength is evaluated by the number of cycles with which one region or another breaks when a predetermined pulsating torque is applied to a tripod joint.

The strength of the tripod member depends on the strength of the root of the trunnion journal and the strength of the trunnion barrel. Increasing the trunnion journal diameter increases the strength of the root of the trunnion journal, and increasing the outer diameter of the trunnion barrel increases the strength of the trunnion barrel.

However, increasing the trunnion journal diameter would necessarily increase the outer diameter of the roller, while increasing the cuter diameter or the trunnion barrel would involve an increase in the minor inner diameter of the outer joint member. Therefore, in achieving the weight reduction and compactification of the tripod joint, it is not sufficient simply to reduce the size of the shell of the outer joint member, since limitation is imposed on the operating region (geometry) of the tripod joint; therefore, balanced design of the various portions becomes important.

Further, rolling fatigue life (flaking life) of the rolling section, particularly between the needle rollers and the trunnion journal also has to be considered. In durability tests, when the tripod joint is driven at a predetermined rpm while applying a predetermined torque, the evaluation of durability is made by the number of cycles or time taken for flaking to occur. Usually, this durability can be, improved by increasing the outer diameter or length of needle rollers or their number, as is known; however, this would lead to an increase in the size of the shell of the outer joint member.

SUMMARY OF THE INVENTION

Therefore, with the balance between strength and durability in mind, the present invention is also intended to reduce the size of the shell of the outer joint member as much as possible so as to achieve weight reduction and compactification of a tripod joint.

According to an embodiment of the invention, a tripod type constant velocity universal joint comprises an outer joint member having three axial track grooves in the inner periphery and roller guide surfaces formed in the opposed side walls of each track groove, a tripod member having three radially projecting trunnion journals, and rollers rotatable around the respective trunnion journals through a plurality of needle rollers and received in the track grooves of the outer joint member, each roller being guided in the outer peripheral surface by the roller guide surfaces, wherein contact between the roller and the roller guide surfaces is circular contact whose contact ratio is 1.01 or above and the width dimension of the roller is reduced to the extent that the contact ellipse produced in the roller during the application of a predetermined torque does not deviate from the end surface of the roller. In other words, as will become clear from the following discussion, the contact ratio defines the ratio of the radius of curvature R of the roller guide surface relative to the radius of curvature r of the roller outer peripheral surface. By ensuring that the form of contact between the roller and the roller guide surfaces is circular contact and setting the contact ratio such that the widthwise contact ellipse length under a predetermined torque load is not more than the widthwise length of the roller, it is made possible to achieve weight reduction, compactification and good durability.

The contact ratio of the roller to the roller guide surface may be so set that the surface contact pressure produced by the roller during the application of a predetermined torque is not more than the contact surface pressure produced between the trunnion journal and the needle rollers. In particular, the contact ratio of the roller to the roller guide surface may range from 1.02 to 1.2.

The ratio Ls/do of the width (Ls) to the outer diameter (do) of the roller may be equal to or less than 0.32. Preferably, the ratio Ls/do may range from 0.24 to 0.27. As the result of setting the contact ratio so that the contact ellipse length is equal to or less than the widthwise length of the roller, it becomes possible to reduce the roller width, contributing to the compactification of the outer joint member and hence of the tripod joint.

The portion of the roller guide surface corresponding to the end of the roller may be formed with a relief portion. The provision of such relief portion prevents the roller from cutting into the roller guide surfaces and makes it possible to obtain good vibration characteristics. Since the corner portion (which is a cold forged surface, thus having no edge) which connects the radius of curvature, R, of the roller guide surfaces to the relief portion makes contact, within the range of the roller outer diameter surface, no cutting-in occurs. Preferably, the relief portion may be in the form of an arc smoothly connected to the roller guide surface.

The angle at which a needle roller can actually skew, that is, the freedom of making of skew angle is restricted by the diametrical clearance (radial clearance) and by the clearance between rollers in the pitch circle (circumferential clearance), and the smaller of the two clearances has a greater influence. In the case of skew due to circumferential clearance, skewing is allowed until needle rollers contact each other; thus, the skew angle ($\theta 1$) in this case is expressed by formula 1:

$$\theta 1 = \cos^{-1}\{d/(D-d)\}\sin(\pi/Z)\} \quad (1)$$

In formula 1, D is the inner diameter of the rollers, d is the needle roller diameter and Z is the number of rollers.

Further, in the case of skewing based on the radial clearance, since skewing can continue until both ends of the roller contact the roller inner diameter, the skew angle $\theta 2$ this time is expressed by formula 2:

$$\theta 2 \approx \sin^{-1}(2\sqrt{Dgr}/1) \quad (2)$$

In formula 2, gr is the radial clearance and 1 is the effective length of the roller.

These skew angles $\theta 1$ and $\theta 2$ are obtained and the smaller one is the skew angle that can actually occur.

And when the radial clearance is set so that the relation between both skew angles $\theta 1$ and $\theta 2$ is $\theta 1 > \theta 2$ and so that the skew angle $\theta 2$ as 4.0°–4.5°, it has been found that the vibration producing force on the tripod joint is at a minimum. With this taken into consideration, it is possible to attain optimization concerning the reduction of vibration of the tripod joint.

According to another embodiment of the invention, the tripod constant velocity universal joint comprises an outer joint member having axially extending track grooves formed at three circumferentially equispaced positions in the inner periphery, a tripod member consisting of a trunnion barrel adapted to be fitted to a shaft for torque transmission and trunnion journals radially projecting from three circumferentially equispaced positions in the trunnion barrel, and rollers respectively attached to the trunnion journals for rotation through a plurality of needle rollers and received in the track grooves, each roller being guided at its outer peripheral surface by roller guide surfaces formed in opposite lateral walls of the track groove, wherein the skew angle of the needle rollers is controlled so that it is within a predetermined specified value.

The skew angle ($\theta 2$) of the needle rollers which is caused by the radial clearances in the needle rollers in an annular space between the roller and the trunnion journal may be controlled so that it is within a predetermined specified value. The skew angle ($\theta 2$) can be determined by suitably combining the values of the roller inner diameter D, radial clearance gr, effective length 1 of the needle roller, on the basis of formula 2 as previously referred to.

Specifically, the preferable range of skew angle ($\theta 2$) may range from 4.0° to 4.5°. This is based on the finding that the thrust force is at a minimum when the skew angle ($\theta 2$) is in the range of 4.0°–4.5°. If the skew angle ($\theta 2$) exceeds 4.5°, the thrust force increases, until it is saturated at a certain level, while, reversely if the skew angle ($\theta 2$) is less than 4.0, the thrust force tends to increases.

The skew angle ($\theta 1$) of the needle rollers which can be produced by the circumferential clearances may be larger than the skew angle ($\theta 2$) of the needle rollers which can be produced by the radial clearances in an annular space between the roller and the trunnion journal. As described above, the smaller of the two types of skew angles, the skew angle ($\theta 1$) which can occur due to the circumferential clearance and the skew angle ($\theta 2$) which can occur due to the radial clearance, is the skew angle which can actually occur; therefore, measures against skewing of needle rollers can be taken by controlling only this skew angle ($\theta 2$) by reducing the latter.

The contact ratio between the roller and the roller guide surfaces may ranges from 1.02 to 1.2 and the width dimension of the roller may be reduced to such a degree that the contact ellipse produced in the roller does not deviate from the end surface of the roller during the application of a predetermined torque. The reason is that if the contact ratio is small during the torque application, the contact ellipse becomes larger, exceeding the width dimension of the roller, leading to a short life, while, reversely, if the contact ratio is large, the contact ellipse becomes smaller, but the surface pressure increases, accelerating the wearing of contact portions, leading to a short life.

Further, reducing the width dimension of the roller contributes to the compactification of the outer joint member and hence the tripod joint in its entirety. Specifically, it may be preferable that the ratio (Ls/do) of the width (Ls) to the outer diameter (do) of the roller be in the range of 0.24–0.27. The smaller this ratio (Ls/do), the smaller the width (Ls) of the roller for its outer diameter (do), contributing more greatly to the compactification. However, excessively reducing the ratio would increase the surface pressure, leading to lowering the strength and durability; thus, the lower limit has been determined from this point of view.

The width dimension of the rollers and the length of the needle rollers may be so set that the contact surface pressure produced between the roller and the roller guide surfaces is substantially equal to the contact surface pressure produced between the trunnion journal and the needle rollers. The reason is that equalizing the contract pressures prevents premature wearing of either one to ensure that the durability of the tripod joint in its entirety will not be degraded.

The strength and durability or a tripod joint are governed mainly by the following design parameters.

Strength parameters: shaft diameter, trunnion journal diameter, trunnion barrel diameter, trunnion barrel width, serration length, roller wall-thickness, roller width.

Durability parameters: FCD, trunnion journal diameter, needle roller length (effective diameter)≈ roller width, needle roller diameter.

As for balance between strength and durability of a conventional article, too much weight is given to the durability side, making it difficult to secure torsional strength when weight reduction and compactification are to be achieved. Further, in the operating region (geometry), if the shaft diameter is kept unchanged and similarity design is made with the minor inner diameter/major inner diameter ratio of the outer joint member as it is, the operating region will decrease.

① Shaft diameter/roller guide surface pitch circle diameter (φds/PCD)

② Trunnion barrel diameter/trunnion outer diameter (φdr/SDj)

③ Minor inner diameter/major inner diameter of outer joint member (φD2/φD1)

④ Roller width/roller outer diameter (Ls/φDs)

⑤ Trunnion journal diameter/roller outer diameter (φDj/φDs)

⑥ Trunnion journal diameter/shaft diameter (φDj/φds)

⑦ Needle roller length/trunnion journal diameter (Ln/φDj).

Reconsideration of the dimensional proportions in the seven above-mentioned items provides an arrangement for tripod joints which is balanced between strength and durability and which is light in weight and compact. Further, it becomes possible to secure the slide amount without decreasing the operating region (geometry). And the reduction of the difference in wall thickness between the major and minor inner diameters of the outer joint member, and the reduction of the trunnion journal length make it possible to improve forgeability.

According to other embodiment of the invention, the tripod joint comprises an outer joint member having axially extending track grooves formed at three circumferentially equispaced positions in the inner periphery, a tripod member consisting of a trunnion barrel adapted to be fitted to a shaft for torque transmission and trunnion journals radially projecting from three circumferentially equispaced positions in the trunnion barrel, and rollers each rotatable around the associated trunnion journal through a plurality of needle rollers and received in the track grooves, each roller being guided at its outer peripheral surface by roller guide surfaces formed in opposite lateral walls of the track groove. The torsional strength of the tripod member and the torsional strength of the smallest outer diameter portion of the shaft are set to be substantially equal, and the surface pressure on the trunnion journals in rolling contact with the needle rollers is allowed up to a predetermined value.

The ratio dr/SDj of the outer diameter dr of the trunnion barrel to the outer diameter SDj of the trunnion may range from 0.65 to 0.70.

The ratio ds/PCD of the diameter ds of the shaft to the pitch circle diameter PCD of the roller guide surfaces may range from 0.50 to 0.55.

The ratio D2/D1 of the minor inner diameter D2 to the major inner diameter D1 of the outer joint member may range from 0.66 to 0.72.

The ratio Ls/Ds of the width Ls to the outer diameter Ds of the rollers may range from 0.24 to 0.27.

The ratio (Ln/Dj) of the length Ln of the needle rollers to the trunnion journal diameter Dj may range from 0.47 to 0.50.

The ratio Dj/Ds of the trunnion journal diameter Dj to the roller outer diameter Ds may range from 0.54 to 0.57.

The the ratio Dj/d of the trunnion journal diameter Dj to the diameter d of the shaft may range from 0.83 to 0.86.

The roots of the trunnion barrel and the trunnion journal may be of two-step shape, and the corner at the trunnion journal may be a predetermined radius of curvature.

BRIEF DESCRIPTION OF THE DRAWINGS

FIG. 4A shows a cross sectional view of a conventional tripod joint;

FIG. 4B shows a cross sectional view of the tripod joint according to an embodiment of the present invention;

DESCRIPTION OF THE PREFERRED EMBODIMENTS

Referring to FIGS. 1 through 3C, a first embodiment of the present invention will be described.

Figure 2A:
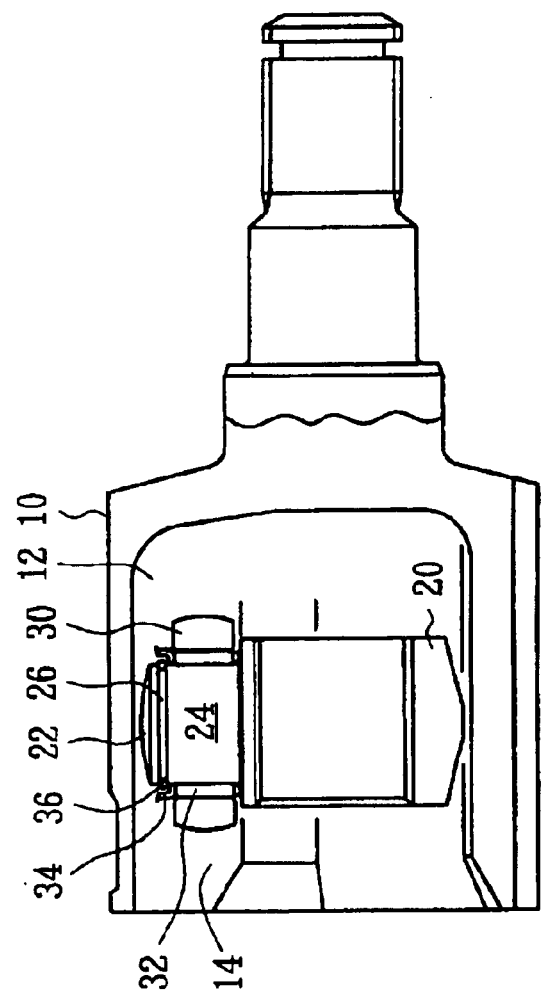
FIG. 2A is a cross sectional view of the tripod joint.
Figure 2B:
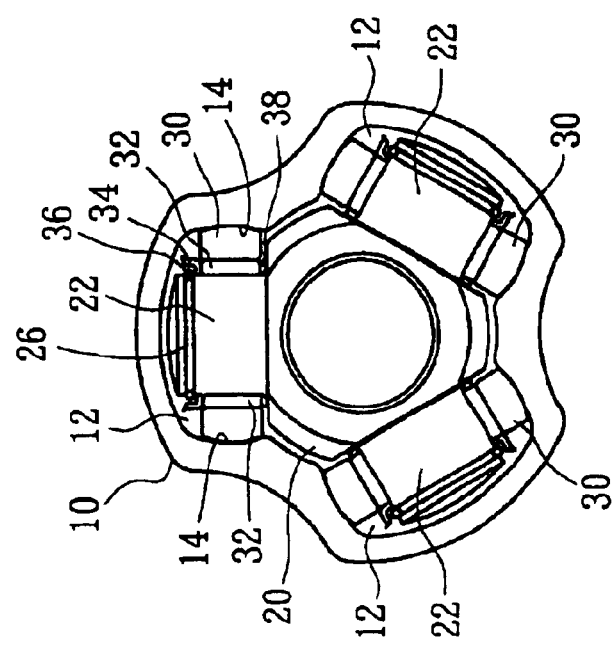
FIG. 2B is a longitudinal sectional view of the tripod joint.

As shown in FIGS. 2A and 2B, a tripod constant velocity universal joint has, as main components, an outer joint member 10 which connects to one of two rotary shafts to be connected, and a tripod unit (20, 30, 32) which connects to the other rotary shaft.

Figure 3A:
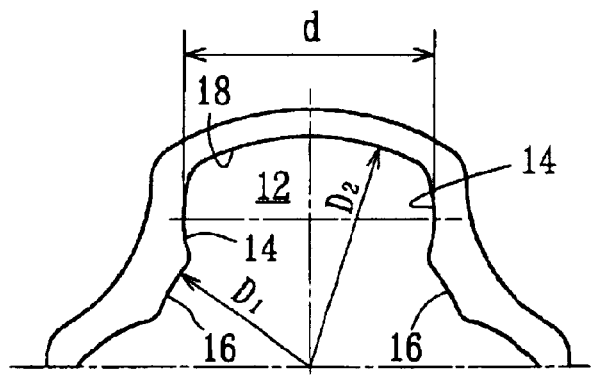
FIG. 3A is an end view of an outer joint member.

The outer joint member 10 is in the form of a hollow cup having three axially extending circumferentially equispaced track grooves 12. Each track groove 12 has roller guide surfaces 14 formed in the opposed side walls thereof. This roller guide surface 14 is part of a cylindrical surface, i.e., a partial cylindrical surface, parallel with the axis of the outer joint member 10. The cross section of the outer joint member 10 is, as shown in FIG. 3A, in the form of a corolla in which circumferentially alternately appearing minor inner diameter portions 16 of diameter D1 and major inner diameter portions 18 of diameter D2 are connected by the roller guide surfaces 14.

The tripod unit includes a tripod member 20, roller 30 and a plurality of needle rollers 32.

Figure 3B:
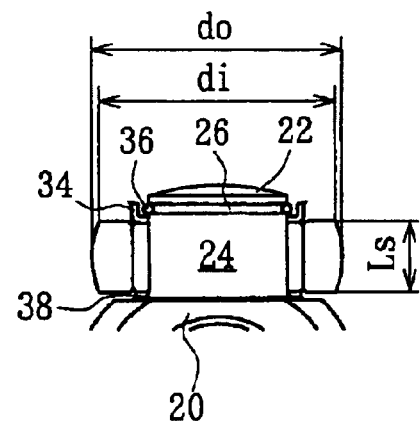
FIG. 3B is a sectional view of a trunnion journal and its surrounding region.

The tripod member 20 has three radially projecting trunnion journals 22 at circumferentially equispaced positions. As shown in FIG. 3B, each trunnion journal 22 has a cylindrical outer peripheral 24 and an annular ring groove 26 formed adjacent the shaft end. The trunnion journal 22 has a roller 30 rotatably fitted thereon through a plurality of needle rollers 32. The cylindrical outer peripheral surface 24 of the trunnion journal 22 provides an inner raceway surface for tie needle rollers 32. The inner peripheral surface of the roller 30 is cylindrical and provides an outer raceway surface for the needle rollers 32.

Figure 3C:
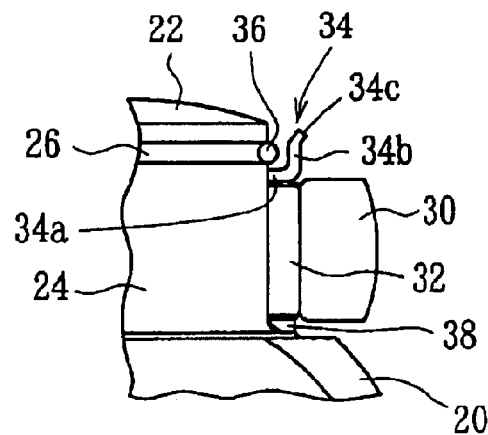
FIG. 3C is a partial enlarged view of FIG. 3B.

The needle rollers 32 contact an outer washer 34 at their end surfaces disposed outside as seen radially of the trunnion 20 and an inner washer 38 at their opposite end surfaces. Axial movement of the outer washer 34 is controlled by a circlip 36 fitted in the ring groove 26 and hence the axial movement of the needle rollers 32 is also controlled. As shown in FIG. 3C, the outer washer 34 consists of a disk portion 34a extending radially of the trunnion journal 22, and a cylindrical portion 34b extending axially of the trunnion journal 22. The cylindrical portion 34a of the outer washer 34 has an outer diameter smaller than the inner diameter of the roller 30 and its end 34c disposed outside as seen radially of the tripod member 20 is increased in diameter to have a diameter larger than the inner diameter of the roller 30. Therefore, the roller 30 is capable of moving axially of the trunnion journal 22.

Figure 1:
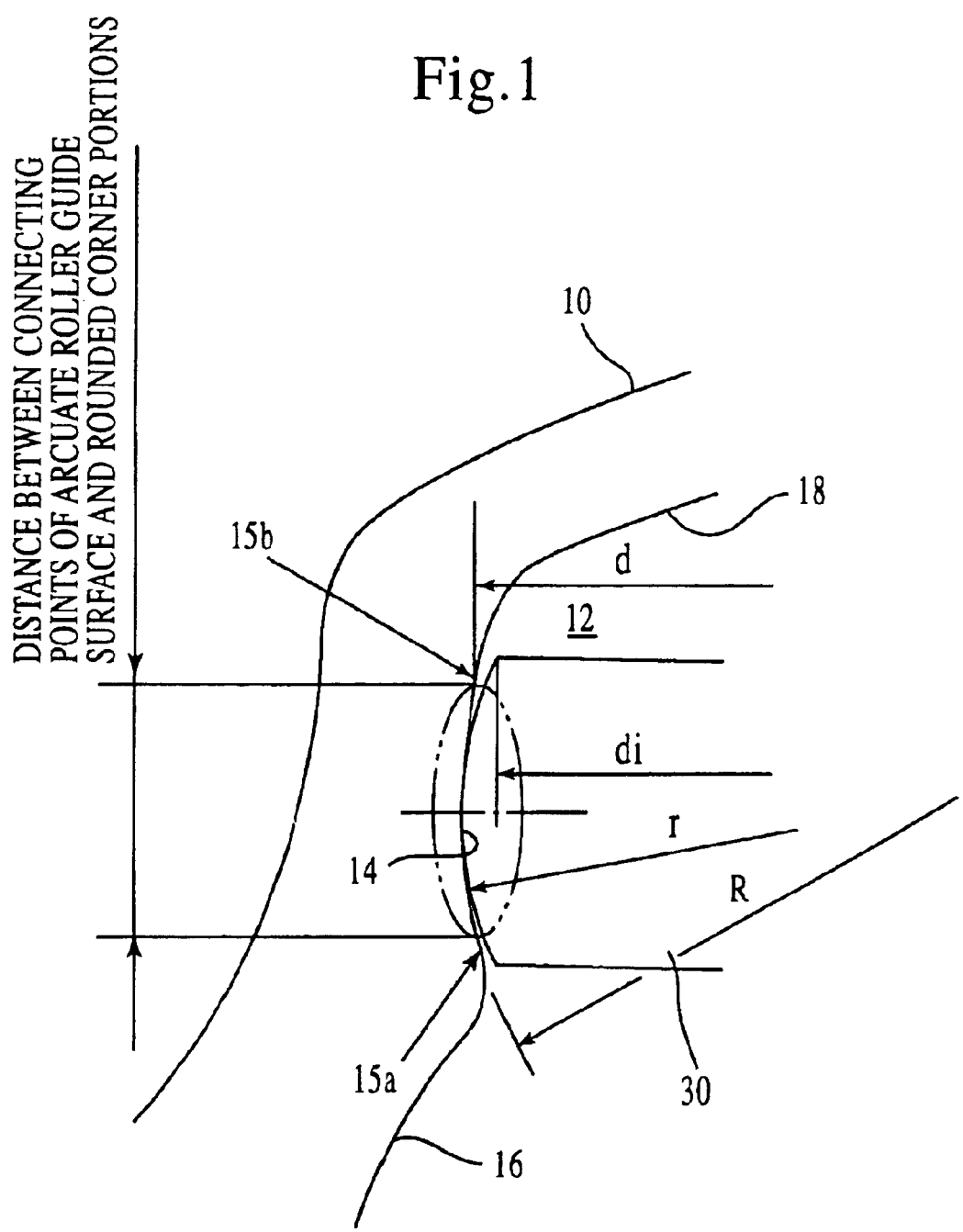
FIG. 1 is an enlarged sectional view of a region of contact between a roller and a roller guide surface in a tripod constant velocity universal joint according an embodiment of the invention.

The outer peripheral surface of the roller 30 is part of a spherical surface, i.e., a partial spherical surface, and has a center of curvature at a portion radially spaced away from the axis and its curvature r is slightly smaller than that of the roller guide surfaces 14 (see FIG. 1). Further, the form of contact between the roller 30 and the roller guide surfaces 14 is arc-to-arc contact as seen in a cross section, i.e., circular contact.

If the contact ratio of the roller 30 to the roller guide surfaces 14 is smaller, during the application of torque the contact ellipse becomes larger, until it exceeds the width of the roller 30, thus reducing the life. Reversely, if the contact ratio is larger, the contact ellipse becomes smaller, but the surface pressure increases to accelerate the wearing of the contact portions, thus reducing the life. Structurally, however, the surface pressure in the tripod joint is severest in the region between the trunnion journal 22 and the needle rollers 32; therefore, it is recommended to set the contact ratio so that the surface pressure in this region does not exceed the limit. Specifically, this contact ratio is preferably in the range of 1.02–1.2, more preferably 1.05–1.18.

By setting the contact ratio so that the length of the contact ellipse is not more than the widthwise length Ls (FIG. 3B) of the roller 30, it becomes possible to reduce the width of the roller 30. Further, doing so contributes to the compactification of the outer joint member 10 and hence the tripod joint in its entirety. Concretely, the ratio Ls/do of the width Ls to the outer diameter do of the roller 30 is 0.32 or less, more preferably 0.24–0.27. The contact ellipse is shown in two-dot chain lines in FIG. 1.

As the tripod joint rotates while taking an operating angle, an angular displacement also occurs between the roller 30 and the roller guide surfaces 14. At this time, as already described, there occurs a phenomenon in which both ends of the roller 30 cut into both ends of the roller guide surfaces 14, i.e., the minor and major inner diameter portions 16 and 18 of the outer joint member 10, with the result that the vibration characteristics aggravates. To prevent this, as shown in FIG. 1, relief portions 15a and 15b are formed in both ends of the roller guide surfaces 14.

Let d be the diameter of the relief portions 15a and 15b and di be the diameter of the end surface of the roller 30, then the amount of relief is expressed by (d−di)/2. If this amount of relief is too small, the phenomenon of the roller 30 cutting into the roller guide surfaces 14 cannot be effectively avoided. Reversely, if the amount of relief is too large, the roller 30 slips off or the area of contact between the roller 30 and the roller guide surfaces 14 reduces, rather forming a cause of aggravation of the vibration characteristic and short life. Therefore, the optimum amount of relief is such that the contact ellipse is within the width of the roller 30 at least during the application of a predetermined torque and no cutting-in occurs. To this end, the diameter d of the relief portions 15a and 15b is not less than the roller end surface diameter di.

Figure 1A:
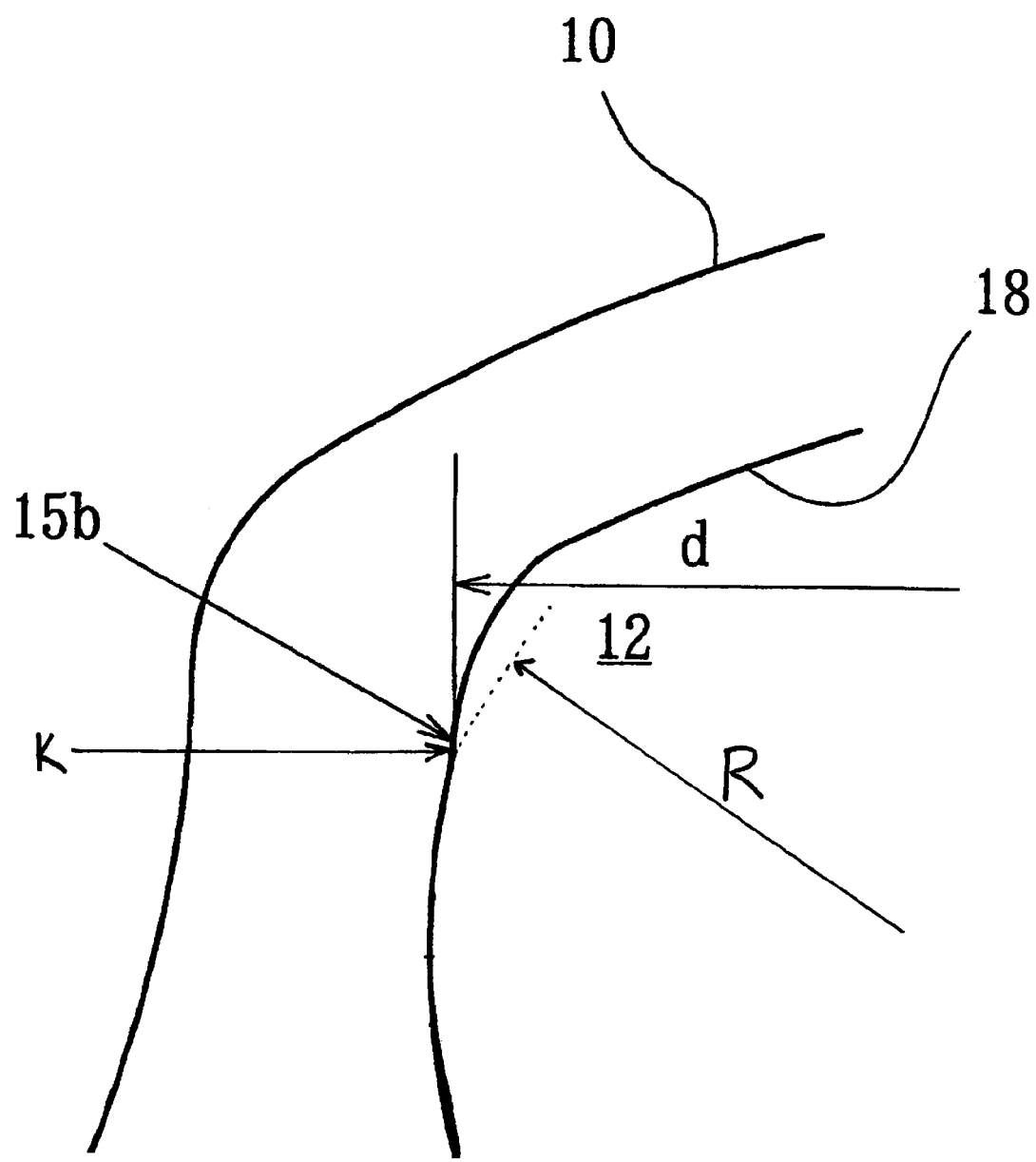
FIG. 1A is an enlarged diagram of relevant portions of FIG. 1 illustrating a corner connecting the radius of curvature of the roller guide surface to the relief portion.

The relief portions 15a and 15b, as seen in a cross section (FIG. 1), are each, respectively, formed by an arcuate curve smoothly connected to a corresponding end of the roller guide surface 14 to the minor and major inner diameter portions 16 and 18 of the outer joint member 10. As shown in FIG. 1A, the relief portions 15a and 15b (only relief portion 15b is shown for exemplary purposes) are connected to the radius of curvature R of the roller guide surface 14 at a corner K. In the embodiment shown by way of example in FIG. 1, the length of the contact ellipse shown in two-dot chain lines is equal to the distance between the points of connection between the roller guide surfaces 14 and the relief portion 15a and 15b.

As has been described, in the first embodiment of the invention, the form of contact between the roller and the roller guide surfaces is circular contact and the contact ratio is set so that the widthwise contact ellipse length is not more than the widthwise length of the roller during the application of a predetermined torque, whereby weight reduction, compactification and good durability of the tripod joint can be achieved. FIG. 4B illustrates this. In FIG. 4A, a conventional tripod joint is shown in the left half and the tripod joint embodying the invention is shown in the right half for comparison.

Further, the provision of relief portions in the roller guide surfaces eliminates the danger of the roller cutting into the roller guide surfaces when the tripod joint is rotating while taking an operating angle; thus, the vibration characteristics are improved and reduction of vibration of the tripod joint has been achieved.

Figure 6:
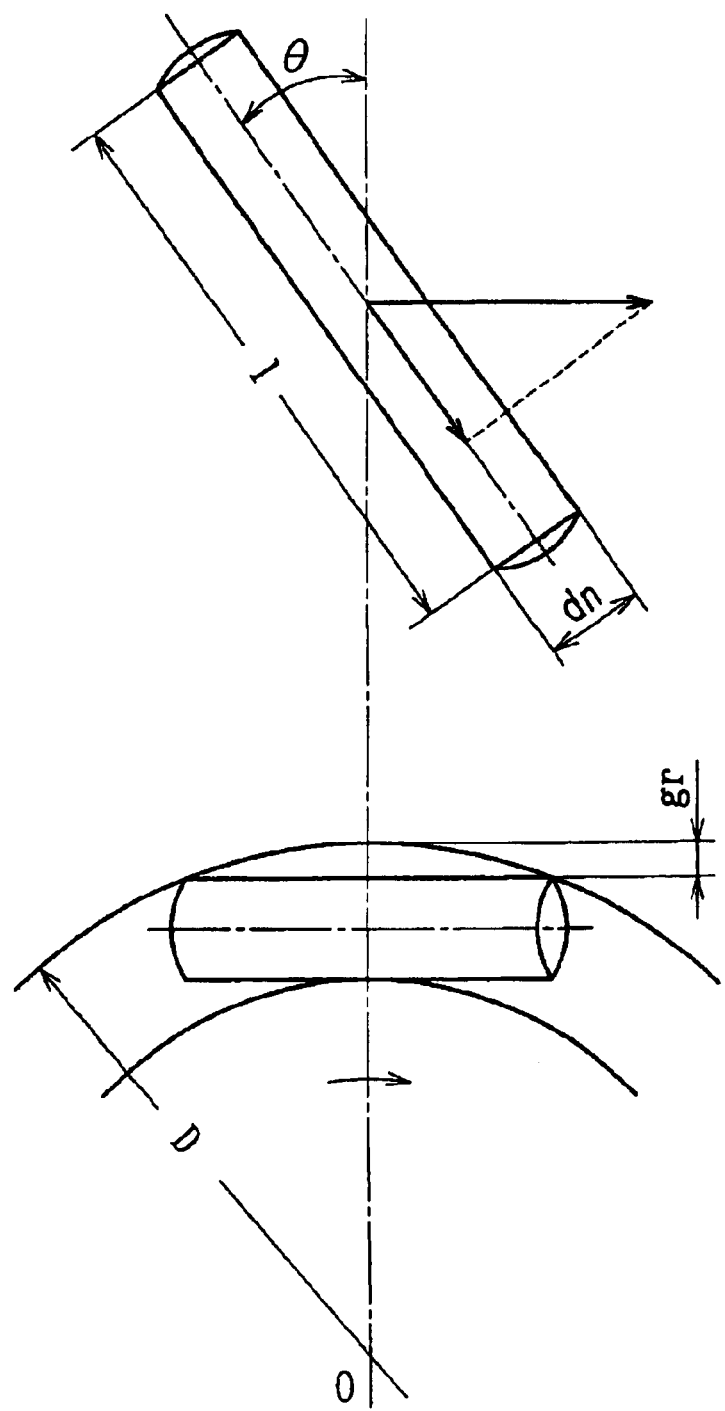
FIG. 6 is an explanatory view for explaining the skew of a needle roller.

Second embodiment of the present invention will now be described with reference to FIGS. 6 and 7.

Figure 5A:
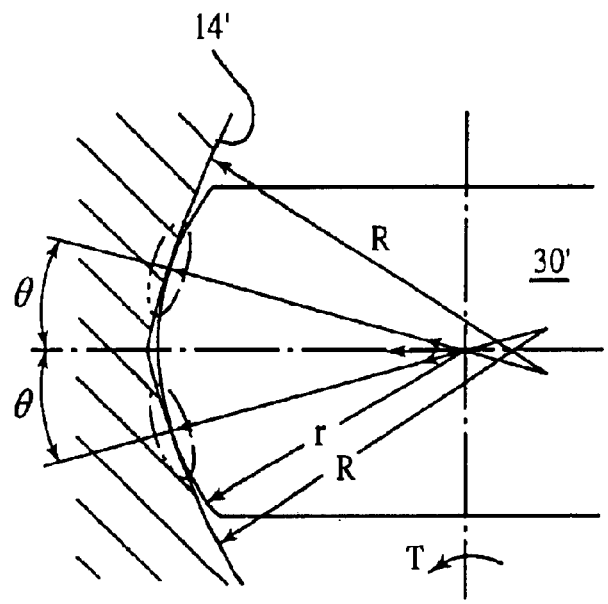
FIGS. 5A and 5B are enlarged sectional views of a region of contact between the roller and the roller guide surface, respectively showing angular contact and circular contact.
Figure 5B:
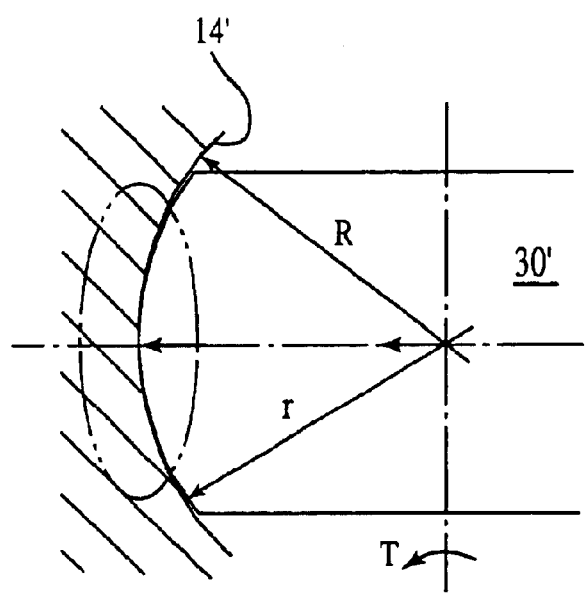

The first and second embodiments are the same as far as the basic construction of tripod joint is concerned and as previously described in connection with FIGS. 2A, 2B, 3A, 3B, and 3C. Here, the outer peripheral surface of the roller 30 may be a partial spherical surface with its center of curvature located on the axis; besides this, it may be a convexly curved surface using an arc as its generating line with its center of curvature located at a position radially spaced from the axis. The form of contact of the roller 30 with the roller guide surfaces 14 may be angular contact as shown in FIG. 5A or circular contact as shown in FIG. 5B, wherein reference character r identifies the radius of curvature of the outer peripheral surface of the roller 30. Angular contact has a certain contact angle and occurs at two points, so that contact ellipses occur at two points in the direction of contact angle. Circular contact occurs between spherical surfaces and at one point. In either case, it is necessary to set the width Ls of the roller 30 so that the contact ellipse does not deviate from the end surface of the roller 30 but comes within the roller width when a predetermined torque is applied. If the contact ratio is small, the contact ellipse becomes larger during torque application, exceeding the width Ls of the roller 30, leading to short life. Reversely, if the contact ratio is large, the contact ellipse becomes smaller, but the surface pressure increases, accelerating the wearing of the contact portions, leading to short life. Structurally, however, the surface pressure in the tripod joint is severest in the region between the trunnion journal 22 and the needle rollers 32; therefore, it is recommended to set the contact ratio so that the surface pressure in this region does not exceed the limit. Concretely, the contact ratio should be in the range of 1.02–1.2 or more preferably in the range of 1.05–1.18. Further, the ratio Ls/do of the width Ls to the outer diameter do of the roller 30 should be 0.24–0.27.

Further, it is desirable that the width Ls of the roller 30 and the effective length 1 of the needle rollers 32 be set so that the contact pressure produced between the roller 30 and the roller guide surfaces 14 is substantially equal to the contact pressure produced between the trunnion journal 22 and the needle rollers 36.

Figure 7:
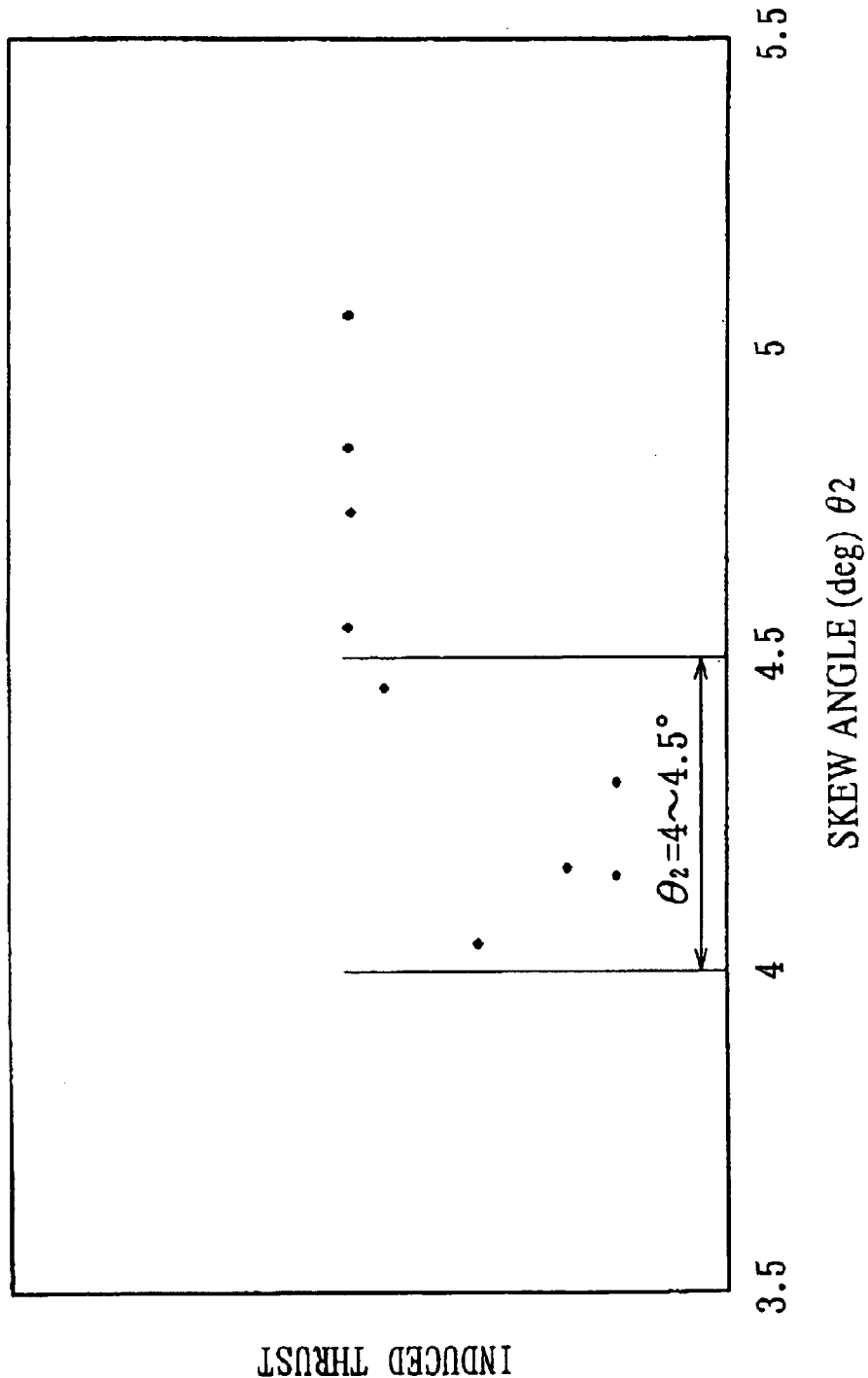
FIG. 7 is a graph showing the relation between skew angle (θ2) and induced thrust.

In the second embodiment, concerning a plurality of tripod joints differing from each other only in the skew ran angle $\theta 2$ of the needle rollers 32 due to radial clearances, their induced thrusts were measured, and the result shown in FIG. 7 was obtained. The test conditions are as follows.

Torque: 294 N·m
Operating angle: 7 deg
RPM: 150

FIG. 7 shows the plotting of thrust force measurement data with the vertical axis representing the induced thrust force in the tripod joint and the horizontal axis representing the calculated skew angle $\theta 2$ (deg). It is seen from the same figure that the thrust force is at a minimum when the skew angle $\theta 2$ is in the range of 4.0°–4.5°. When the skew angle $\theta 2$ exceeds 4.5°, the thrust force increase until it saturates at a certain level. Further, skew angle $\theta 2$ becomes smaller than 4.0, the thrust force tends to increase. Therefore, concerning the skew of the needle rollers 32, setting the skew angle $\theta 2$ in the range of 4.0°–4.5° makes it possible to reduce the induced thrust in the tripod joint and achieve reduction of vibration.

As described above, the tripod joint according to the second embodiment comprises an outer joint member having axially extending track grooves formed at three circumferentially equispaced positions in the inner periphery, a tripod member consisting of a trunnion barrel adapted to be fitted to a shaft for torque transmission and trunnion journals radially projecting from three circumferentially equispaced positions in the trunnion barrel, and rollers respectively attached to the trunnion journals for rotation through a plurality of needle rollers and received in the track grooves, each roller being guided at its outer peripheral surface by roller guide surfaces formed in opposite lateral walls of the track groove. Accordingly, it becomes possible to reduce vibration in a tripod joint by controlling the skew angle of the needle rollers so that it is within a predetermined specified value.

Since the smaller of the two types of skew angles, the skew angle ($\theta 1$) which can occur due to the circumferential clearance and the skew angle ($\theta 2$) which can occur due to the radial clearance, is the skew angle which can actually occur, measures against skewing of needle rollers can be taken by controlling only the latter skew angle ($\theta 2$), by ensuring that the skew angle ($\theta 1$) of the needle rollers which can be produced by the circumferential clearances is larger thaw the skew angle ($\theta 2$) of the needle rollers which can be produced by the radial clearances in an annular space between the roller and the trunnion journal ($\theta 1 > \theta 2$).

Third embodiment of the invention will now be described with reference to FIGS. 8A, 8B, 9A, and 9B.

Figure 8A:
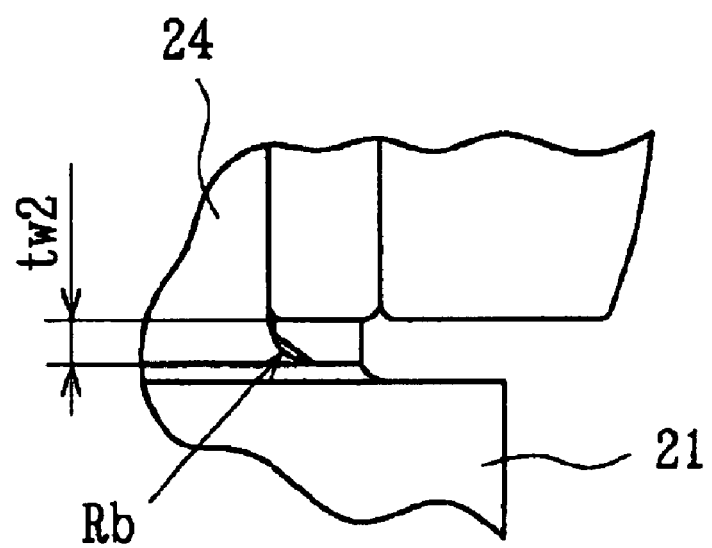
FIG. 8A is an enlarged sectional view of the root of a trunnion journal.
Figure 8B:
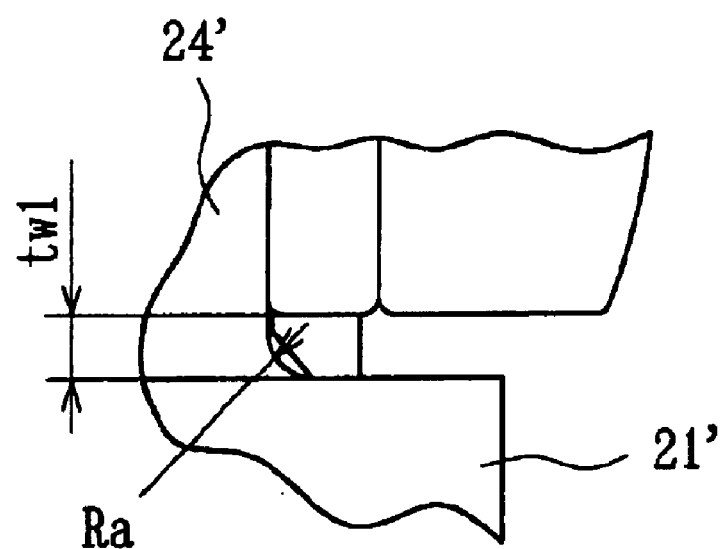
FIG. 8B is an enlarged sectional view of a portion corresponding to FIG. 8A in a conventional tripod joint.
Figure 9B:
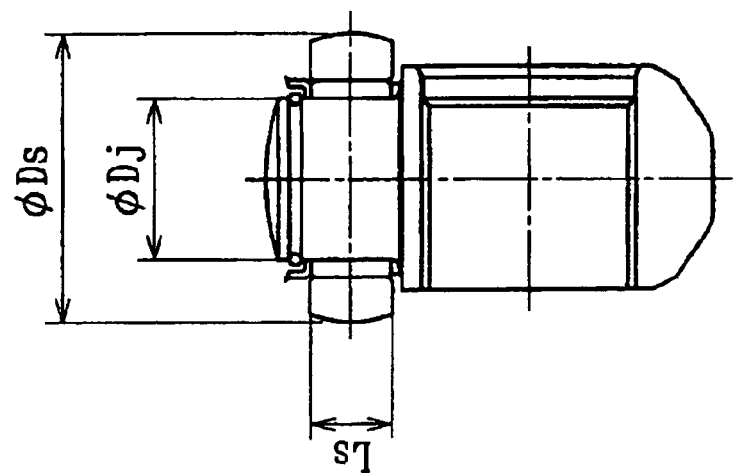
FIGS. 9A and 9B are, respectively a cross sectional view and a longitudinal sectional view of a tripod unit, both showing the dimension of various portions of the tripod joint.
Figure 9A:
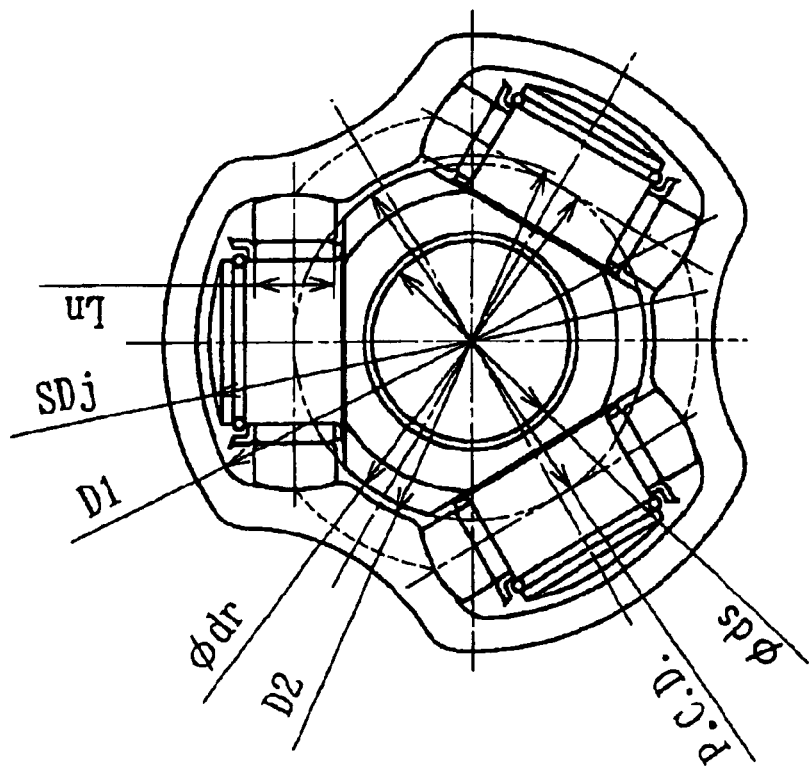

The first, second, and third embodiments are the same as far as the basic construction of tripod joint is concerned and as previously described in connection with FIGS. 2A, 2B, 3A, 3B, and 3C. Here, the root of the trunnion journal 22, as shown in FIG. 8A, is of two-step shape, That is, a step portion rising from the trunnion barrel 21 is formed and a cylindrical outer peripheral surface 24 extends from the step portion. The corner at the base end of the cylindrical outer peripheral surface 24 is one continuous surface having a predetermined radius of curvature Rb. In the case of prior art shown in FIG. 8B, the trunnion barrel 21' directly connects to the cylindrical outer peripheral surface 24' through a surface having a radius of curvature Ra. As is apparent from a comparison between the two figures, there are relations Ra>Rb and tw1>tw2.

Table 1 shows examples with reconsideration given to the dimensional proportions of various portions in the embodiment shown in FIGS. 2A and 2B.

TABLE 1

| ITEM | RECONSIDERATION OF PROPORTIONS (%) | | EFFECTS RESULTING FROM RECONSIDERATION | | | |
|---|---|---|---|---|---|---|
|  | Prior art | Examples | a | b | c | D |
| Φ ds/PCD | 45–49 | 50–55 | ○ | ○ | – | – |
| Φ dr/SDj | 60–63 | 65–70 | – | ○ | ○ | – |
| φ D2/φ D1 | 59–64 | 66–72 | – | – | ○ | ○ |
| Ls/φ Ds | 32–36 | 24–27 | ○ | ○ | – | – |
| Φ Dj/φ Ds | 46–57 | 54–57 | – | ○ | – | – |
| Φ Dj/φ ds | 73–86 | 83–86 | – | ○ | – | – |
| Ln/φ Dj | 58–76 | 47–50 | ○ | ○ | – | – |

In the examples shown in Table 1, the dimensions of the various portions (see FIGS. 9A and 9B) in the arrangement of FIGS. 2A and 2B were set as follows.

A ratio or proportion (φds/PCD) of shaft diameter/PCD was set to 50%–55%. The shaft diameter φds was determined from the allowable load capacity, and the pitch circle diameter PCD of the roller guide surface 14 was determined from the ratio of the width Ls of the roller 30 to the outer diameter φDs.

A ratio or proportion (φdr/SDj) of trunnion barrel diameter/outer diameter of the trunnion was set to 65%–70%. The trunnion barrel diameter φdr was determined from the torsional strength during the application of a predetermined torque, and the trunnion outer diameter SDj was determined from the width Ls of the roller 30, the washer height, and the major inner diameter φD1 of the outer joint member 10.

A ratio or proportion (φD2/φD1) of minor inner diameter/major inner diameter of the outer joint member 10 was set to 66–72%. The minor inner diameter φD2 of the outer joint member 10 was set to a value which allows the securing of an operating region for the shaft diameter φds and trunnion barrel diameter φdr, and the major inner diameter D1 was determined from the pitch circle diameter PCD of the track groove 12 and the trunnion outer diameter SDj.

A ratio or proportion (Ls/φDs) of width/outer diameter of the roller 30 was set to 24%–27%. The width Ls and outer diameter φDs of the roller 30 were set to optimum values by considering the contact ellipse length and contact surface pressure between the roller 30 and the roller guide surface 14 when a predetermined toque was applied.

A ratio or proportion (φDj/φDs) of trunnion journal diameter/roller outer diameter was set to 54% –57%. The trunnion journal diameter φDj was made equal to the current dimension in order to secure torsional strength, and the roller outer diameter φDs was set on the basis of the contact surface pressure.

A ratio or proportion (φDj/φds) of trunnion journal diameter/shaft diameter was set to 83%–86%. It was set to the same dimension as the current proportion in order to secure torsional strength and durability.

A ratio or proportion (φLn/φDj) of needle roller length/trunnion journal diameter was set to 47%–50%. The needle roller length Ln was set by considering the maximum contact surface pressure for the bearing. In addition, by reducing the size of the root R of the trunnion journal 22 and thinning the inner washer to correspondingly increase the diameter of the root to provide a stepped shape, the wall thickness between the root and the serrations increases and it is also possible to increase the torsional strength.

In Table 1, the columns a–d under the heading of effects resulting from reconsideration indicate the following items.

a: lightweight, compact
b: balance between strength and durability
c: processability
d: securing of operating region The third embodiment of the present invention, taking notice of the facts that the conventional tripod joints are designed with particular attention paid to the aspect of strength, particularly the strength of the shaft and that in the aspect of durability there is some room in the ordinary use, while considering balance between strength and durability, reduces the size of the shell of the outer joint member as much as possible, thus achieving weight reduction and compactification of the tripod joint. In the aspect of strength, the shaft and the tripod member are made substantially equal in strength and in the aspect of durability, notice is taken of the contact surface pressure between the needle rollers and the trunnion journal, and this surface pressure is allowed up to a predetermined value, whereby a radically compact design of an outer joint member has been achieved.

In the aspect of durability, notice is taken of contact surface pressure in the trunnion journal and the contact surface pressure in the trunnion journal is allowed up to about 1.15 times as large as the usual value (see Table 2), as compared with the conventional tripod joint. Since the conventional tripod joint has not less than twice the durability of the DOJ (double offset joint), the tripod joint according to the third embodiment of the present invention should have durability equal to or greater than that of the DOJ.

TABLE 2

|  | Elliptic leg axis | True circle leg axis |
|---|---|---|
| Prior art | 259.2 | 343.7 |
| Examples | 292.9 | 398.1 |
| Proportion | 1.13 | 1.16 |

Unit: kgf/mm$^2$

What is claimed is:

1. A tripod constant velocity universal joint comprising:
   an outer joint member having three axial track grooves in an inner periphery and roller guide surfaces formed in opposing side walls of each track groove;
   a tripod member having three radially projecting trunnion journals; and
   rollers carried by respective trunnion journals and received in the track grooves of said outer joint member, each roller being guided on a part-spherical outer peripheral surface by said roller guide surfaces,
   wherein contact between said roller and said roller guide surfaces is circular contact having a contact ratio 1.01 or above,
   wherein a width dimension of said roller is reduced to an extent that a contact ellipse produced by said roller during application of a predetermined torque does not deviate from an end surface of said roller,
   wherein said contact ratio is defined by a ratio of a radius of curvature of said roller guide surface relative to a radius of curvature of said outer peripheral surface,
   wherein a portion of said roller guide surface corresponding to the end of said roller is formed with a relief portion, and
   wherein said relief portion is a concave arc smoothly connected to a corner located at each end of said roller guide surface.

2. A tripod constant velocity universal joint as set forth in claim 1, wherein a plurality of needle rollers are disposed between each trunnion journal and the corresponding rollers carried by the trunnion journal, the contact ratio of said roller to said roller guide surface is set wherein contact surface pressure produced on said roller during application of the predetermined torque is not more than contact surface pressure produced between said trunnion journal and said needle rollers.

3. A tripod constant velocity universal joint as set forth in claim 1, wherein the contact ratio of said roller to said roller guide surface is 1.02–1.2.

4. A tripod constant velocity universal joint as set forth in claim 1, wherein a ratio Ls/do of the width (Ls) to an outer diameter (do) of said roller is 0.32 or below.

5. A tripod constant velocity universal joint as set forth in claim 4, wherein the ratio Ls/do of the width (Ls) to the outer diameter (do) of said roller is 0.24–0.27.

* * * * *